(12) United States Patent
Miao et al.

(10) Patent No.: US 9,235,049 B1
(45) Date of Patent: Jan. 12, 2016

(54) FIXED FOCUS CAMERA WITH LATERAL SHARPNESS TRANSFER

(71) Applicant: Google Inc., Mountain View, CA (US)

(72) Inventors: Xiaoyu Miao, Palo Alto, CA (US); Hayes S. Raffle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/716,475

(22) Filed: May 19, 2015

Related U.S. Application Data

(62) Division of application No. 13/563,289, filed on Jul. 31, 2012, now Pat. No. 9,065,993.

(51) Int. Cl.
| | |
|---|---|
| *G02B 27/00* | (2006.01) |
| *G02B 13/24* | (2006.01) |
| *G02B 9/02* | (2006.01) |
| *H04N 5/262* | (2006.01) |
| *H04N 5/232* | (2006.01) |
| *G02B 3/02* | (2006.01) |

(52) U.S. Cl.
CPC .............. *G02B 27/0075* (2013.01); *G02B 9/02* (2013.01); *G02B 13/24* (2013.01); *H04N 5/23296* (2013.01); *H04N 5/2628* (2013.01)

(58) Field of Classification Search
CPC ........ H04N 5/2254; G02B 3/02; G02B 15/00; H01N 5/2254; B29D 11/00298; B29D 11/0048; C03B 11/08; C03B 23/22

USPC ............. 348/335, 240.99, 345; 359/642, 648, 359/677; 451/42; 65/37; 264/1.1, 1.32
See application file for complete search history.

(56) References Cited

U.S. PATENT DOCUMENTS

| | | |
|---|---|---|
| 8,355,039 B2 | 1/2013 | Michrowski et al. |
| 2006/0116763 A1 | 6/2006 | Simpson |
| 2010/0097487 A1 | 4/2010 | Marom et al. |
| 2010/0328502 A1 | 12/2010 | Ogasahara |
| 2011/0157399 A1 | 6/2011 | Ogasahara |
| 2011/0164323 A1 | 7/2011 | Liege et al. |
| 2012/0105575 A1 | 5/2012 | Silveira |
| 2012/0248637 A1 | 10/2012 | Chang et al. |
| 2012/0307133 A1 | 12/2012 | Gao et al. |

OTHER PUBLICATIONS

"Aspheric Lens." *Wikipedia: The Free Encyclopedia*. http://en.wikipedia.org/w/index.php?title=Aspheric_lens&printable=yes (retrieved Jun. 27, 2012; last modified Jun. 16, 2012), 6 pages.
U.S. Appl. No. 13/563,289, filed Jul. 31, 2012, U.S. Office Action mailed Apr. 22, 2014 (6 pages).
U.S. Appl. No. 13/563,289, filed Jul. 31, 2012, U.S. Notice of Allowance mailed Feb. 19, 2015 (18 pages).

*Primary Examiner* — Kelly L Jerabek
(74) *Attorney, Agent, or Firm* — Blakely Sokoloff Taylor & Zafman LLP

(57) ABSTRACT

A lens includes a depth of field ("DOF") range and a macro range. The macro range is distinct and separate from the DOF range. The macro range is a near field relative to the DOF range. The DOF range provides a first field of view ("FOV") while the macro range provides a second FOV that is smaller than the first FOV within the DOF range. The lens transfers sharpness from a peripheral viewing region within the macro range into a central viewing region within the macro range.

10 Claims, 6 Drawing Sheets

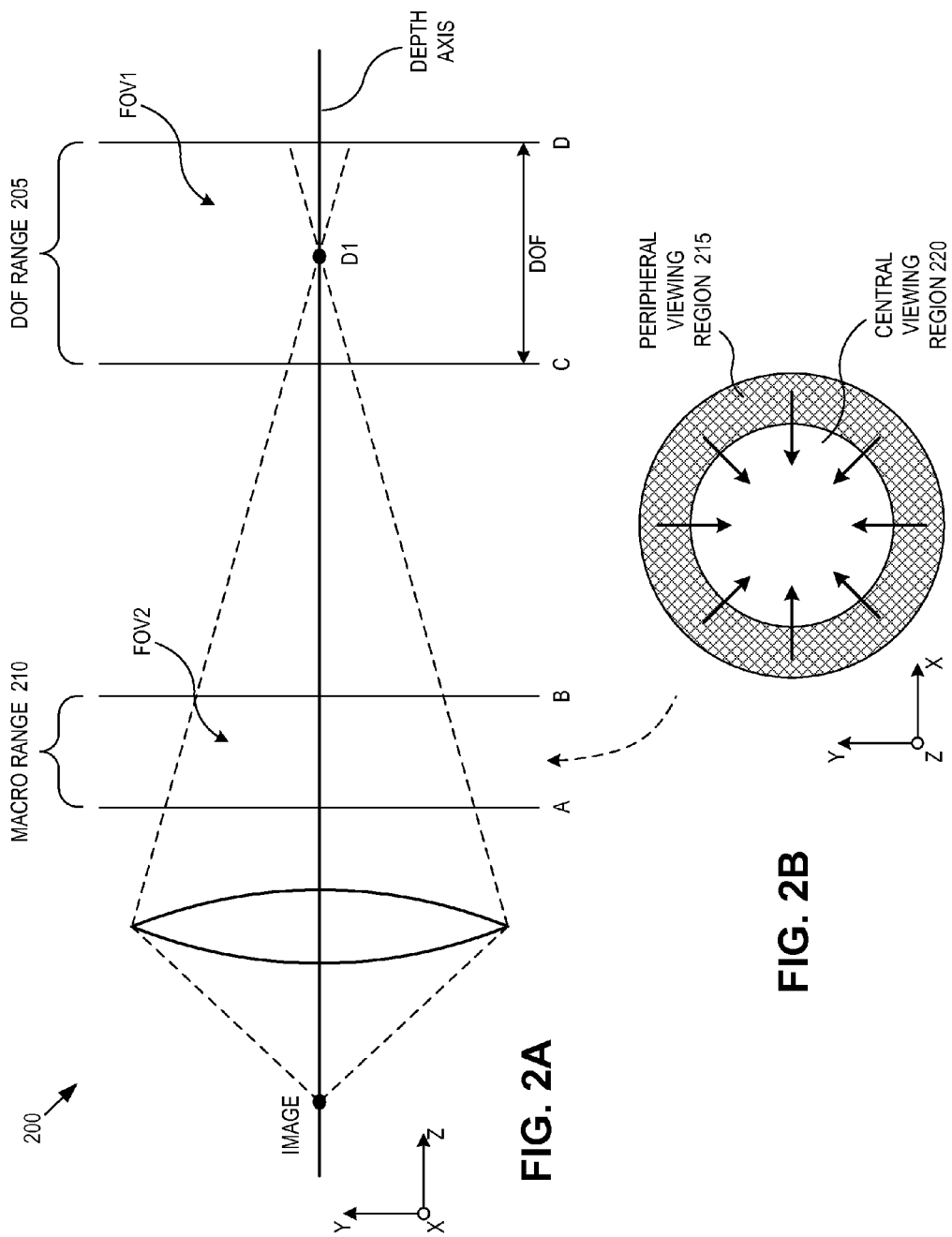

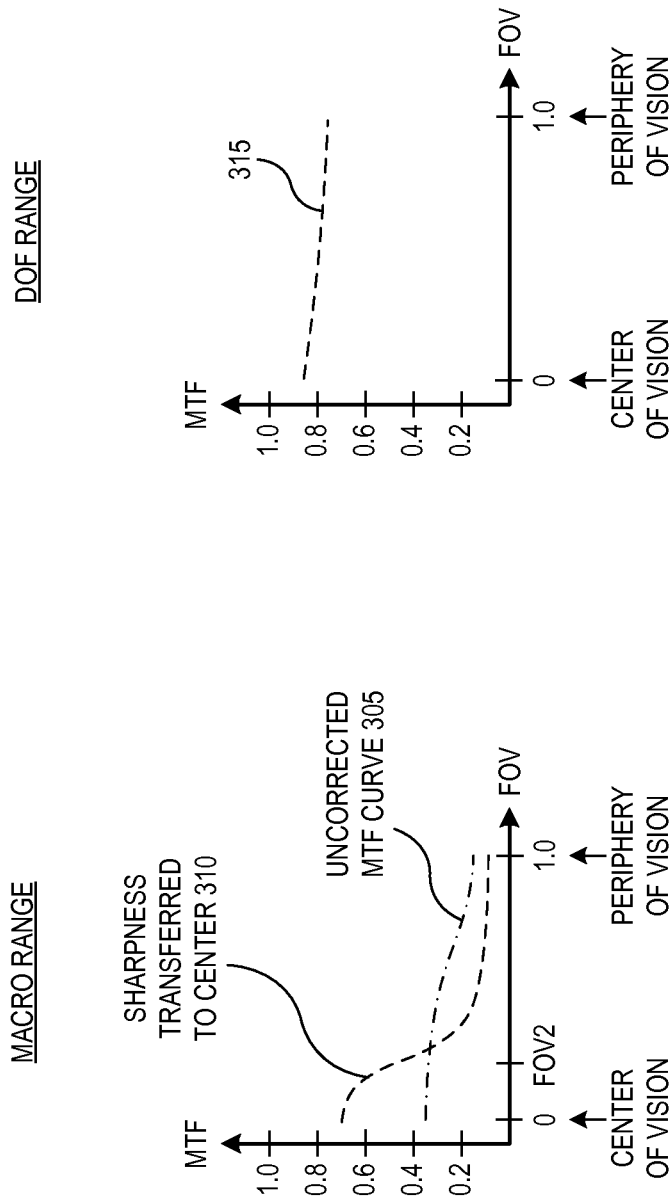

$$Y = \{[\beta_{11}MTF(z_{M1},0.0FOV2) + \beta_{12}MTF(z_{M1},0.1FOV2) + \beta_{13}MTF(z_{M1},0.2FOV2) + ...]\} +$$

$$\{[\beta_{21}MTF(z_{M2},0.0FOV2) + \beta_{22}MTF(z_{M2},0.1FOV2) + \beta_{23}MTF(z_{M2},0.2FOV2) + ...]\} +$$

$$\{[\beta_{31}MTF(z_{M3},0.0FOV2) + \beta_{32}MTF(z_{M3},0.1FOV2) + \beta_{33}MTF(z_{M3},0.2FOV2) + ...]\} + ...$$

US 9,235,049 B1

FIXED FOCUS CAMERA WITH LATERAL SHARPNESS TRANSFER

CROSS-REFERENCE TO RELATED APPLICATIONS

This application is a divisional of U.S. patent application Ser. No. 13/563,289, filed Jul. 31, 2012, the contents of which are hereby incorporated by reference.

TECHNICAL FIELD

This disclosure relates generally to optics, and in particular but not exclusively, relates to fixed focus imaging.

BACKGROUND INFORMATION

In optics, the depth of field ("DOF") is the range between the nearest object and the furthest object in the scene that appears acceptably sharp in the image. A lens can only precisely focus on a single depth within a scene, as such sharpness gradually decreases on either side of the focus distance. Objects that fall within the depth of field are considered to have acceptable sharpness.

Some cameras have a variable focus lens while others have a fixed-focus lens. A variable focus lens enables the camera to translate its depth of field to focus on objects at variable distances from the camera. A fixed-focus camera does not have this ability and therefore has a non-translatable depth of field. Variable focus lenses are typically more bulky and more expensive than fixed-focus lenses and often include auto-focus circuitry with an actuator to move the lens system back and forth to achieve the best focus at a large range of object distances. Auto-focus introduces a number of disadvantages such as an increase in cost, size, weight, power consumption, and focus latency as the optical components are moved.

A fixed-focus lens of a fixed-focus camera typically has a depth of field biased towards the far field (e.g., greater than 1 m). This means that the fixed-focus camera typically does not have a macro-capability to focus on the near field (objects positioned close to the camera). For example, a picture taken of a book positioned at typical reading distances ends up unsatisfactorily blurry.

At least one technology exists for extending the depth of field of a fixed-focus camera and is aptly referred to as Extended Depth of Field ("EDOF"). This technology uses lenses designed to purposefully have large longitudinal chromatic aberration. FIG. 1A illustrates an example EDOF lens 100. As illustrated, the red (R), green (G), and blue (B) wavelengths are focused to different focal points by EDOF lens 100. Doing so extends the depth of field of EDOF lens 100 compared to standard lenses, which typically strive to minimize chromatic aberration to reduce image blurriness.

The mean transfer function ("MTF") is a measure of sharpness after a ray of light passes through an optical system. An MTF of 1.0 means that the ray of light loses no sharpness after passing through the optical system. FIG. 1B illustrates a demonstrative MTF curve 101 of a standard lens system and a demonstrative MTF curve 102 of an EDOF lens system. As illustrates, the EDOF technique operates to broaden MTF curve 102 while slightly lowering the MTF within the DOF. In essence, the EDOF transfers sharpness along the object distance axis (depth axis extending from the lens system towards the object) from outside the EDOF to within the EDOF, but in so doing slightly lowers the overall MTF value.

In order to obtain an acceptably sharp image when using an EDOF lens, significant post processing steps, to convert the chromatically dispersed image into a sufficiently clear image, are required. Thus, EDOF cameras consume greater power relative to a conventional fixed-focus lens and can be more expensive due to the additional post processing circuitry. Because of the required post processing, an EDOF lens can only be used with an EDOF image sensor capable of performing the post processing functionality. When designing camera systems, an EDOF lens limits the designer's image sensor options.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 2A illustrates a lens with lateral sharpness transfer in a macro range and a standard depth of field ("DOF") range, in accordance with an embodiment of the disclosure.

FIG. 2B illustrates a field of view ("FOV") of a lens having lateral sharpness transfer from a peripheral view into a central view, in accordance with an embodiment of the disclosure.

FIG. 3A is a chart illustrating an uncorrected MTF curve of a conventional lens and an MTF curve of a lens having lateral sharpness transfer in a macro range, in accordance with an embodiment of the disclosure.

FIG. 3B is a chart illustrating an MTF curve within a DOF range of a lens having lateral sharpness transfer in a macro range, in accordance with an embodiment of the disclosure.

DETAILED DESCRIPTION

Figure 1A:
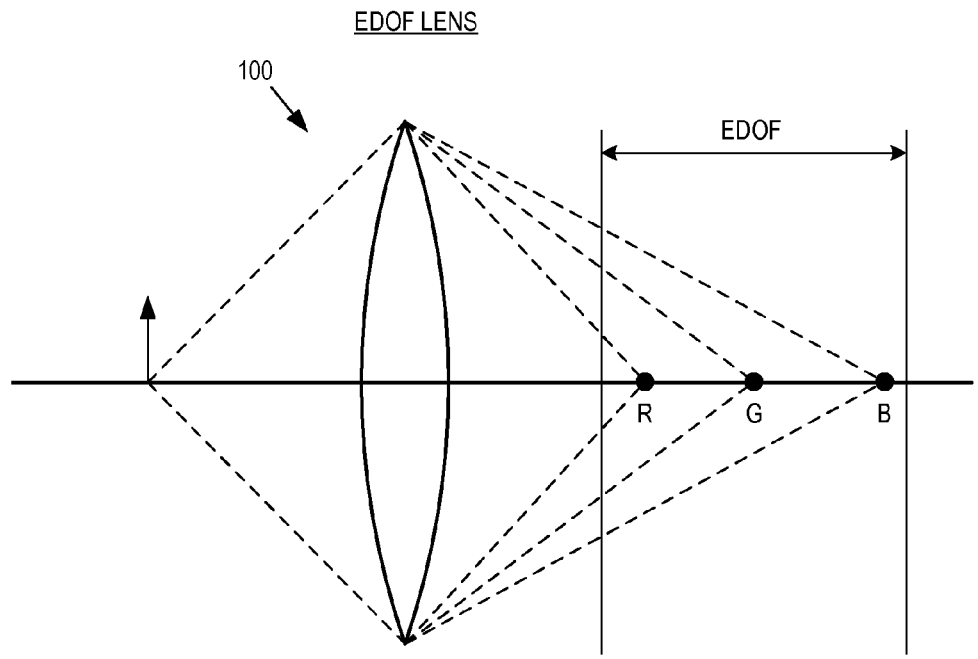
FIG. 1A (Prior Art) illustrates an extended depth of field ("EDOF") lens having an EDOF.
Figure 1B:
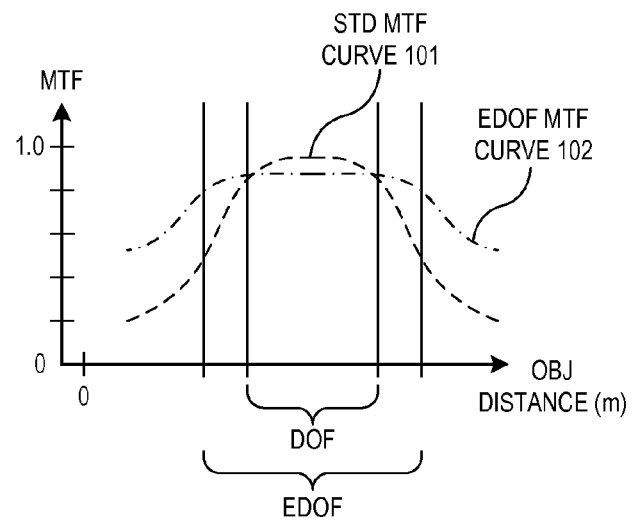
FIG. 1B (Prior Art) is a chart illustrating the mean transfer function ("MTF") curve along the object distance axis for a conventional lens and an EDOF lens.

Embodiments of an apparatus and method for a fixed-focus camera which preserves normal depth of field, but also has the capability to capture macro shots through a mechanism of lateral sharpness transfer at the macro distances are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 2A illustrates a lens 200 with lateral sharpness transfer in a macro range and includes a standard depth of field ("DOF") range, in accordance with an embodiment of the disclosure. In the illustrated embodiment, lens 200 is a fixed focus lens that includes a standard DOF range 205 and a macro range 210. Lens 200 is designed to have sufficient operational sharpness within both DOF range 205 and macro range 210. Sharpness is achieved within macro range 210, which falls outside of the DOF of lens 205, by sacrificing an in-focus field of view ("FOV") within macro range 210. The in-focus FOV is the angle over which an image perceived through lens 200 is deemed to be sufficiently sharp. Sharpness within macro range 210 is transferred from a peripheral viewing region 215 into a central viewing region 220 within macro range 210 (see FIG. 2B). Thus, the in-focus viewing angle is curtailed within macro range 210 to achieve improved sharpness in the center of view within macro range 210. In one embodiment, the in-focus field of view within macro range 210 (FOV2) is reduced relative to the in-focus field of view within DOF range 205 (FOV1). In practical use, this configuration provides lens 200 with a larger in-focus FOV for far field images, while providing a narrower in-focus FOV within macro range 210 (e.g., FOV1>FOV2).

Lens 200 has a focal distance D1 that falls within DOF range 205. DOF range 205 defines the conventional DOF of lens 200, which extends along the depth axis from C to D. Lens 200 also includes macro range 210 which is distinct and separate from DOF range 205 and extends from A to B. Macro range 210 is a near field relative to the far field of DOF range 205. In one embodiment, DOF range 205 extends along the depth axis from C=60 cm to D=infinity, while macro range 210 extends along the depth axis from A=20 cm to B=40 cm. Of course, other distances for A, B, C, and D may be implemented.

In one embodiment, the DOF of lens 200 (which falls within the DOF range 205) may be defined with respect to the circle of confusion (CoC) of the camera system within which lens 200 is incorporated. For example, the CoC may be defined as n*P, where P is the pixel width of an image sensor used in connection with lens 200 and n is a multiplier. For example, for n=2 and P=1.75 um, CoC would be 3.5 um. The DOF may then be determined according to Equation 1, $$DOF = \frac{2*N*CoC*(m+1)}{m^2 * \left(\frac{N*CoC}{f}\right)^2},$$ (Equation 1)

wherein N is the lens f-number, m is the lens magnification, and f is the lens focal length. Of course, other conventional techniques for defining DOF may be used.

Macro range 210 and DOF range 205 provide two distinct viewing regions for lens 200. DOF range 205 is the conventional DOF of the lens and designed to have an in-focus FOV (e.g., FOV1=70 degrees) and sufficient sharpness for a viewer to perceive far field objects with typical sharpness for everyday viewing. In contrast, macro range 210 is designed to facilitate image recognition ("IR"), bar code scanning, or optical character recognition ("OCR") using a narrower in-focus FOV (e.g., FOV2=30 degrees). Of course, other in-focus field of views for FOV1 or FOV2 may be used. FOV2 can be substantially less than FOV1 because IR, OCR, and bar code scanning can be achieved with a relatively narrow in-focus FOV and the items being scanned can be swept through the macro range in-focus FOV (e.g., FOV2), if the item does not fit entirely within the macro range in-focus FOV. Furthermore, the degree of sharpness achieved within FOV2 of macro range 210 need only be sufficient for the selected task of IR, OCR, or bar code scanning. In some embodiments, the sharpness within FOV2 of macro range 210 is less than the sharpness within DOF range 205.

In one embodiment, lens 200 is designed by specifying mean transfer function ("MTF") requirements for lens 200 within both DOF range 205 and macro range 210. This is in contrast to conventional lenses where the designer typically only specifies MTF requirements within the DOF of the lens. For lens 200, MTF requirements are also stipulated outside of the DOF of lens 200. In addition, the MTF requirements may be specified over a range of viewing angles in increments along the depth axis within each of DOF range 205 and macro range 210. Specifying MTF requirements does not necessarily mean that the absolute value of the MTF for each viewing angle at each depth axis location is specified; rather, specifying MTF requirements includes specifying an MTF trend, relative MTF value, or relative MTF weight for viewing angles and depth axis location. Furthermore, specifying MTF requirements can include specifying minimum and/or maximum values for the MTF trend, value, relative value, or weights.

FIGS. 3A and 3B illustrate MTF curves over a range of viewing angles for designing lens 200. FIG. 3A is a chart illustrating MTF curves within macro range 210. Curve 305 represents an uncorrected MTF curve for a conventional lens. As illustrated, curve 305 is relatively flat and has a low MTF indicating a blurry image with low sharpness. This is expected for conventional lenses since MTF outside of the DOF is treated as a don't care scenario. In contrast, curve 310 is lower than curve 305 in the peripheral viewing region, but quickly climbs near the center of vision or central viewing region. Thus, sharpness has been transferred from the periphery into the center. This design choice sacrifices in-focus FOV in macro range 210 for increased sharpness in a narrower in-focus FOV outside the standard DOF. FIG. 3B is a chart illustrating an MTF curve 315 within DOF range 205 of lens 200. Since DOF range 205 is the primary viewing range of lens 200, the MTF requirements are higher and flatter over the FOV. In the illustrated embodiment, curve 315 represents the primary MTF curve of lens 200 and lateral sharpness transfer is not applied in DOF range 205.

Figure 7:
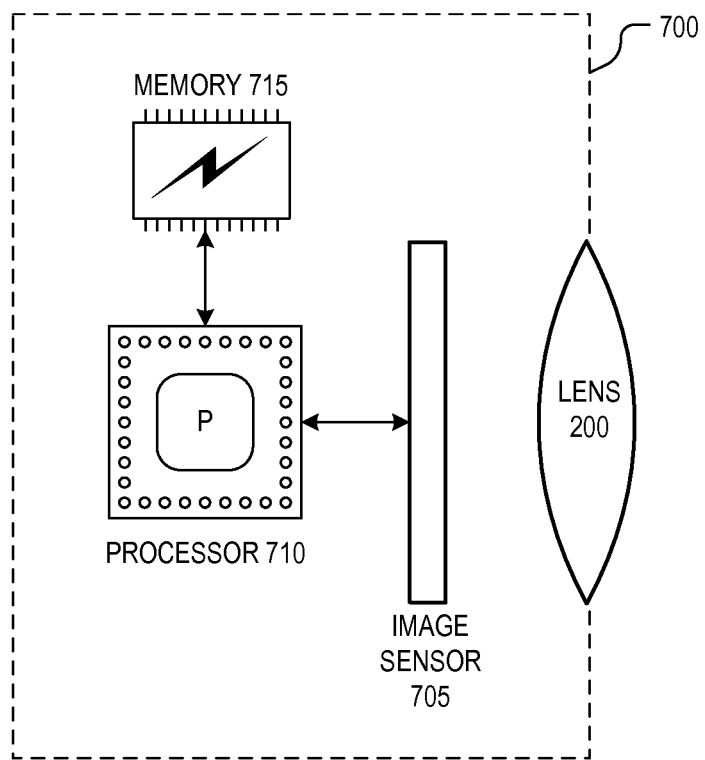
FIG. 7 is a functional block diagram illustrating an example camera system including a lens with lateral sharpness transfer, in accordance with an embodiment of the disclosure.

The dual field nature of lens 200 is well suited for use with a camera system integrated on a head mounted display ("HMD") or smart phone. For example FIG. 7 illustrates an example camera system 700 that includes lens 200, an image sensor 705, a processor 710, and memory 715. Camera system 700 is well suited for integration within an HMD or smart phone. Lens 200 provides in-focus capabilities in the far field, while also supporting macro field functions, such as IR, bar code scanning, or OCR. Since lens 200 is a fixed focus lens, it does not include bulky actuator components that consume significant power and increase manufacturing costs. In one embodiment, when operating camera system 700 for macro field functions, post image effects, such as cropping, can be performed by processor 710 using instructions stored in memory 715. The cropping may be performed to crop out the out-of-focus peripheral viewing region 215 while retaining central viewing region 220. When the camera system is used to capture far field images in DOF range 205, the peripheral cropping may be disabled to take advantage of the large in-focus FOV.

Figure 4:
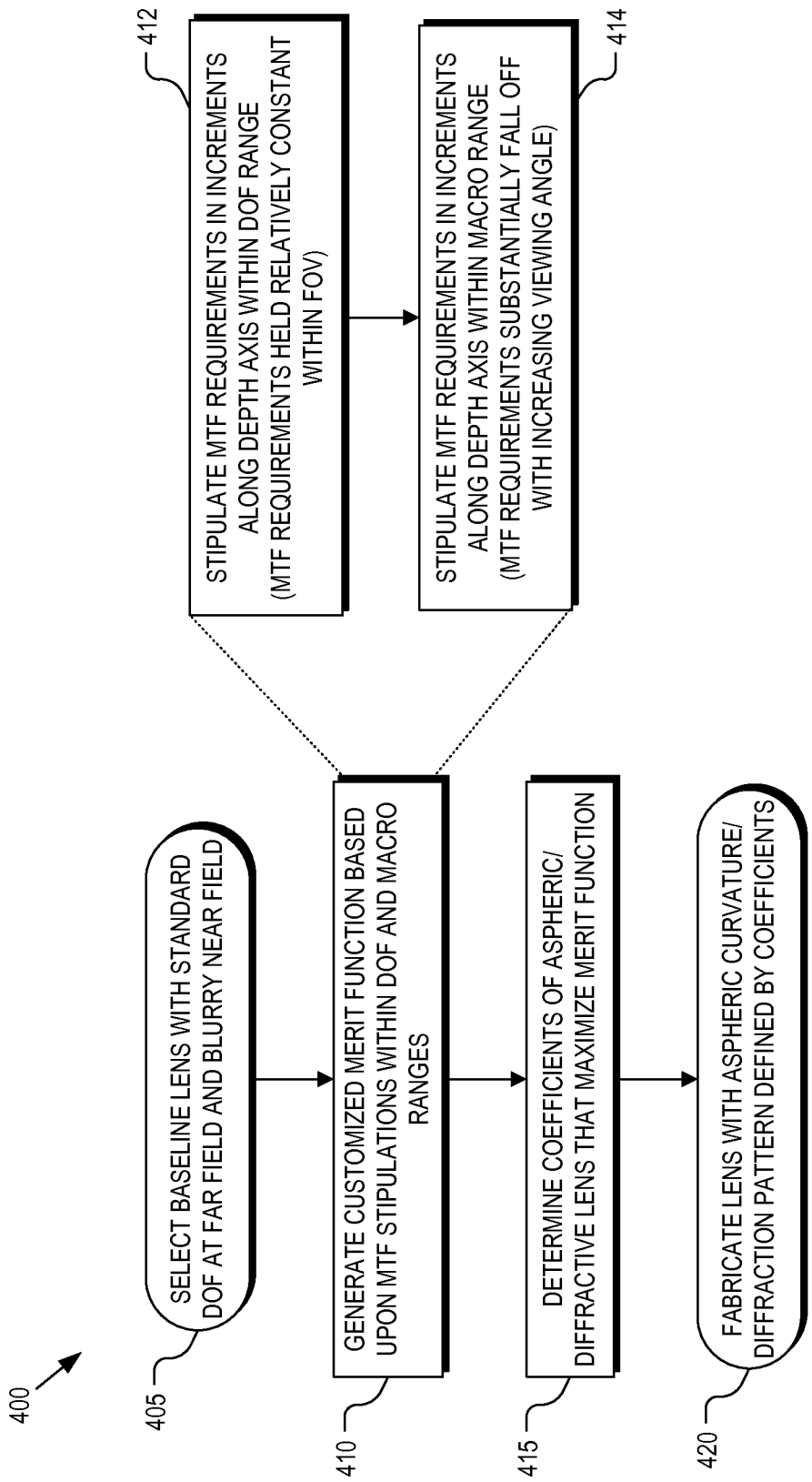
FIG. 4 is a flow chart illustrating a process for designing/fabricating a lens having lateral sharpness transfer in a macro range outside of its DOF range, in accordance with an embodiment of the disclosure.

FIG. 4 is a flow chart illustrating a process 400 for designing/fabricating lens 200 having lateral sharpness transfer in macro range 210 outside of its DOF range 205, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, a baseline lens with a standard DOF in the far field and a typically blurry near field in macro range 210 is selected. The baseline lens may be selected as a refractive aspheric lens or a diffraction lens (e.g., diffraction pattern). Process 400 is described in connection with a refractive aspheric lens for merely descriptive purposes, but one of ordinary skill having the benefit of the instant disclosure will appreciate that the technique described herein may be applicable to diffraction lenses. The physical shape of aspheric lens 500 (see FIG. 5) can be described according to the following equation, $$z(r) = \frac{r^2}{R\left(1 + \sqrt{1-(1+k)\frac{r^2}{R^2}}\right)} + \alpha_1 r^2 + \alpha_2 r^2 + \alpha_3 r^2 + \ldots, \quad \text{(Equation 2)}$$

where z(r) describes the surface displacement at distance r, $\alpha_i$ are coefficients that describe the deviation of the surface from the axially symmetric quadric surface specified by R and k. Of course, other techniques for describing an aspheric lens may be used.

Figures 5, 6:
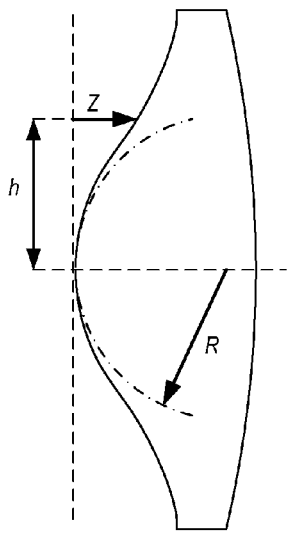
FIG. 5 illustrates a refractive aspheric lens having a shape designed to provide lateral sharpness transfer in a macro range outside of its DOF range, in accordance with an embodiment of the disclosure.
FIG. 6 illustrates a portion of an example Merit Function for determining the shape or pattern of a lens having lateral sharpness transfer in a macro range, in accordance with an embodiment of the disclosure.

In a process 410, a customized Merit Function is determined. The Merit Function provides MTF stipulations within DOF range 205 and macro range 210. In one embodiment, the MTF stipulations are MTF weights or multipliers provided for a number of viewing angles for selected increments along the depth axis. An example Merit Function Y is illustrated in FIG. 6, where $B_{ij}$ are weighting coefficients for specifying MTF requirements, MTF(z,b*FOV) is the mean transfer function calculated for a lens, such as lens 500 as specified by Equation 2, determined at distance z along the depth axis for viewing angle b*FOV, specified as a fraction of the field of view. It is noteworthy that the Merit Function Y, illustrated in FIG. 6, only illustrates the variables specified within the macro range 210. The variable $z_{mk}$ is specified in increments, such as tenths of a centimeter from, for example, 20 cm to 40 cm for macro range 210. In a process block 412, weighting coefficients $B_{ij}$ substantially decrease with increasing viewing angle b*FOV within macro range 210. In one embodiment, the Merit Function Y also includes variables specified within DOF range 210 (e.g., $z_{Dk}$ for >60 cm), not illustrated. In a process block 414, the weighting coefficients $B_{ij}$ specified in the DOF range 205 are relatively constant over FOV1 when compared to the weighting coefficients $B_{ij}$ specified in macro range 210 over FOV2. However, even within DOF range 205, the MTF may be allowed to modestly fall off with increasing viewing angle (see FIG. 3B).

In a process block 415, the MTF values are calculated, using known ray tracing techniques at each viewing angle and incremental depth axis position, for many different coefficient combinations of $\alpha_i$. These MTF values are plugged into the Merit Function Y. The set of coefficients that results in MTF values that maximize (or nearly maximize) the Merit Function Y is selected and determines the physical shape (or physical pattern if a diffractive lens) of aspheric lens 500. Finally, in process bock 420, lens 500 is fabricated with a physical shape as defined by Equation 2 using the selected set of coefficients.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A camera system, comprising:
    an image sensor; and
    a lens positioned in front of the image sensor to focus image light onto the image sensor, the lens including:
        a depth of field ("DOF") range;
        a first in-focus field of view ("FOV") within the DOF range;
        a macro range that is distinct and separate from the DOF range, wherein the macro range is a near field relative to the DOF range; and
        a second in-focus FOV within the macro range that is smaller than the first in-focus FOV within the DOF range, wherein the lens transfers sharpness from a peripheral viewing region within the macro range into a central viewing region within the macro range.

2. The camera system of claim 1, wherein a first mean transfer ("MTF") of the lens within the macro range decreases with increasing viewing angle.

3. The camera system of claim 2, wherein a second MTF of the lens within the DOF range is substantially constant over the first in-focus FOV.

4. The camera system of claim 1, wherein the macro range extends along a depth axis from approximately 20 cm to 40 cm offsets from the lens.

5. The camera system of claim 4, wherein the DOF range extends along the depth axis approximately 60 cm to infinity offsets from the lens.

6. The camera system of claim 1, wherein the DOF range is determined based at least in part upon a circle of confusion for the camera system and the circle of confusion is determined at least in part based upon a pixel size of the image sensor.

7. The camera system of claim 1, wherein the lens comprises a diffractive lens.

8. The camera system of claim 1, wherein the lens comprises an aspheric refractive lens.

9. The camera system of claim 1, wherein the lens comprises a fixed focus lens.

10. The camera system of claim 1, further comprising:
   a processor coupled to the image sensor to execute instructions; and
   memory coupled to the processor to store the instructions, which when executed cause the processor to crop images acquired by the image sensor to crop out the peripheral viewing region when acquiring images of items located within the macro range from the camera system.

* * * * *